15
United States Patent Office 2,954,947
Patented Oct. 4, 1960

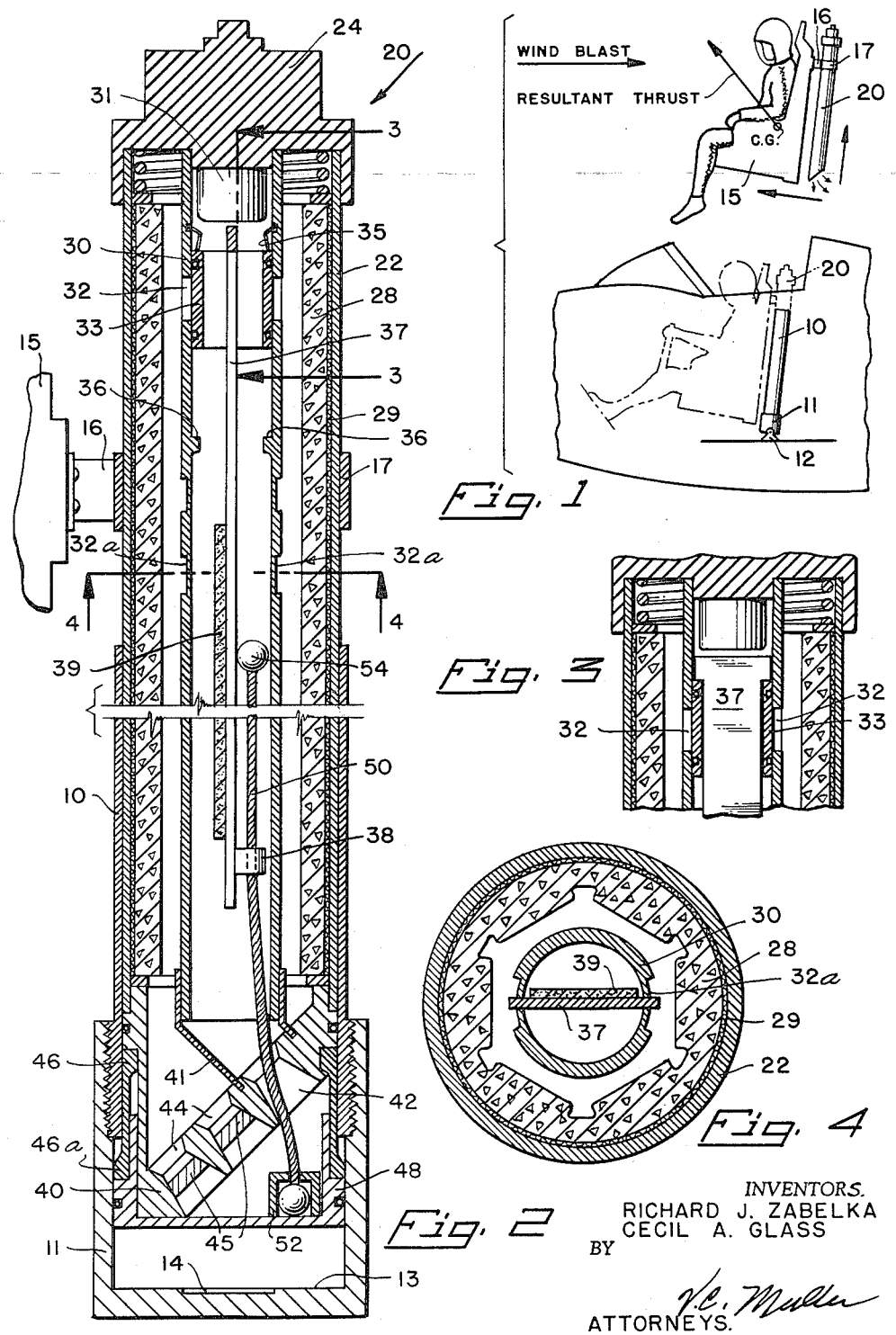

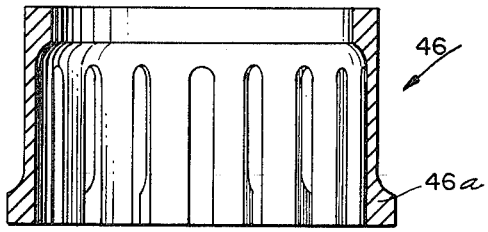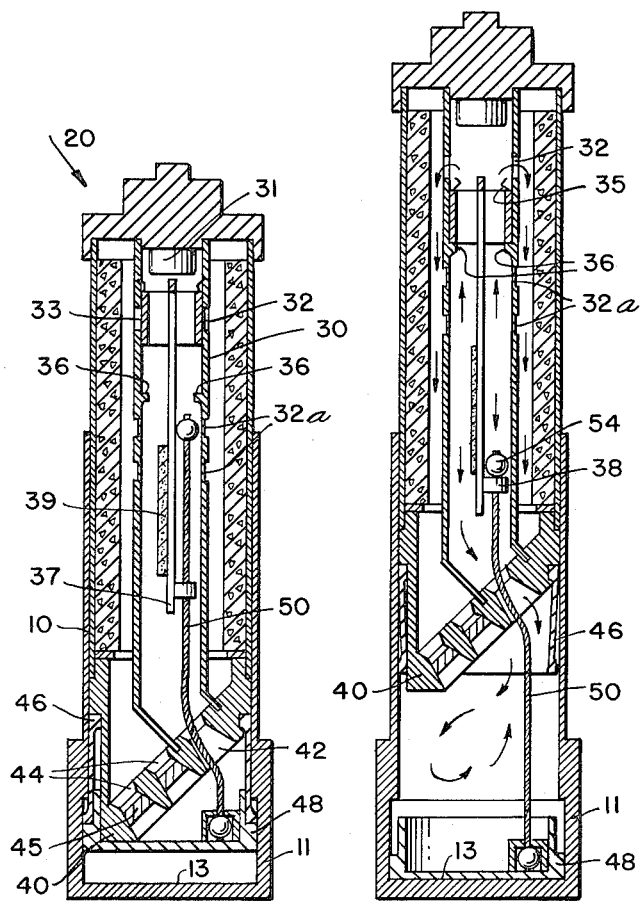

2,954,947

ROCKET ASSISTED PILOT EJECTION CATAPULT

Richard J. Zabelka and Cecil A. Glass, China Lake, Calif., assignors to the United States of America as represented by the Secretary of the Navy Filed Nov. 21, 1958, Ser. No. 775,660

4 Claims. (Cl. 244—122)

(Granted under Title 35, U.S. Code (1952), sec. 266)

The invention described herein may be manufactured and used by or for the Government of the United States of America for governmental purposes without the payment of any royalties thereon or therefor.

This invention relates to combined piston action and rocket action aircraft ejection seats and in particular to those ejection seats having a rocket motor assembly with a booster tube for the production of piston action gases disposed within the central perforation of the sustainer propellant grain.

Such ejection seats are used principally in connection with military aircraft, where it is desired to propel the pilot to safe parachute height, even when ejection is initiated at ground level, as in take-off or landing situations. Piston action, that is combustion gases contained within a launching tube working against a slidably engaged piston, provides the initial booster thrust, propelling the seat the first few feet necessary to leave the cockpit. Free flight rocket action, provides the sustainer thrust propelling the seat to safe parachute height after leaving the cockpit.

The copending application of Cecil A. Glass, Serial No. 775,662, filed concurrently with this application discloses an ejection seat having a booster tube for the production of piston action gases within the central perforation of the sustainer propellant grain. The invention disclosed herein represents an improvement upon the device disclosed in the copending application.

In the copending device referred to the sustainer grain is ignited by a portion of the hot booster gases flowing through apertures extending through the booster tube wall. The apertures are initially closed by the booster propellant strips, which are fixed to the inner surface of the booster tube and are later opened when, as the result of partially burning away, the portions of the propellant strips covering the apertures rupture and permit the hot booster gases to flow into the zone about the sustainer grain. The ignition of the sustainer grain is timed by the web thickness and burning characteristics of the booster propellant, and therefore the reliability of this timing means is limited by the inherent instability of a combustion process.

It is an object of the present invention to provide an upwardly directed aircraft ejection seat with reliable timing means for firing the sustainer propellant to permit performance ejection.

It is another object to provide a positive mechanical means for timing the ignition of the sustainer propellant of a seat ejection rocket motor having a booster tube disposed within the central perforation of the sustainer grain.

A still further object is to provide within an aircraft ejection seat a means for locking the piston and rocket motor assembly within the launcher tube that automatically unlocks when the launcher tube is pressurized.

Other objects and many of the attendant advantages of this invention will be readily appreciated as the same becomes better understood by reference to the following detailed description when considered in connection with the accompanying drawing wherein:

Fig. 1 illustrates the use of an aircraft ejection seat with the present invention, Fig. 2 is a longitudinal central section of the launcher tube, rocket motor tube, and booster tube assembly, Fig. 3 is a section taken along line 3—3 of Fig. 2, Fig. 4 is an enlarged section taken along line 4—4 of Fig. 2, Fig. 5 is an enlarged sectional view of the locking ring, Figs. 6A, 6B, and 6C are sections like Fig. 2 illustrating sequential conditions during ejection.

Referring in detail to the drawing, and particularly Fig. 1, the subject of the invention comprises, in general, a launcher tube 10, a launcher breech 11 secured to the frame of the aircraft by any suitable trunnion 12, a rocket motor assembly 20 which is slidably engaged in the launcher tube 10, and a pilot's seat 15 which is rigidly attached to the rocket motor assembly by a suitable bracket 16 and clamping ring 17.

Referring now to the rocket motor assembly, Fig. 2, the outer casing 22, nose cap 24, and nozzle assembly 40, form a combustion chamber which contains a cylindrical internal burning sustainer propellant grain 28, having a central perforation extending between its ends. The sustainer grain 28 is bonded to the outer casing 22 by polysiloxane dipped cotton tape 29, which also functions as obturator means between the grain and casing, the grain being otherwise supported in the combustion chamber by means of spacers, springs, or other means known in the art.

A booster tube 30, the ends of which are rigidly secured to the nose cap 24 and nozzle assembly 40, is disposed within the central perforation of the sustainer grain with annular clearance to provide free volume within the sustainer grain 28. The booster tube 30 forms an inner combustion chamber with one end closed by the nose cap 24 and the other end communicating with a booster nozzle 42 through an elbow connection 41. The booster tube has a plurality of apertures 32 extending through its wall, which at the start of ejection are closed by a tubular slide valve 33 held in position by releasable detents 35. A T-bar 37 is adapted to open the apertures 32 by moving the slide valve 33 to a position against the stop lugs 36. Several weakened zones 32a are adapted to rupture when the sustainer propellant grain 28 is ignited, these being optionally employed, depending upon the amount of communication area desired between the booster tube and the free volume within the sustainer grain. The booster tube igniter 31 is disposed adjacent the nose cap and the booster propellant strip 39 is mounted to the shank of the T-bar 37.

The nozzle assembly 40 contains sustainer nozzles 44 communicating with the free volume within the sustainer grain 28 and a similar booster nozzle 42 communicating with the booster tube. The nozzles are oriented with their axes passing at or near the combined man-seat mass, as illustrated in Fig. 1, in order to prevent tumbling and to counteract the impact of the high speed wind blast. The sustainer nozzles 44 contain tightly fitted blow-out plugs 45 which remain fixed therein until the sustainer propellant grain 28 is ignited, said plugs being made of any suitable material, such as aluminum, capable of resisting the heat of gases within the launcher tube during booster action. Brazed to the nozzle assembly 40 is a locking ring 46, shown as assembled in Fig. 2 and shown separately in Fig. 5, having a serrated trailing edge portion 46a, adapted to be engaged and locked between the wall of the launcher breech 11 and a cup-shaped piston 48, thereby locking the rocket assembly against unauthorized movement within the launcher tube. Piston 48, hereinafter referred to as a reflex piston, is adapted to move into an abutting relation with the breechblock zone 13, of the launcher breech 11, when the launcher tube is pressurized; the breechblock zone 13 having an airpocket 14, shown in Fig. 2, to receive the air trapped behind the reflex piston 48. The launcher breech 11 is removable, permitting access to load the rocket motor assembly 20, cable 50, and reflex piston 48 into the launcher tube 10.

A lost motion linkage comprising a cable 50, having one end thereof fixed to the reflex piston 48 by any suitable fastening device 52, and thence passing through the booster nozzle 42, and thence through an abutment or sleeve 38 brazed to the T-bar 37 and having an abutment 54 frictionally secured thereon a fixed distance beyond the sleeve, connects the T-bar 37 and reflex piston 48, and is adapted to open the slide valve 33 after the rocket motor has moved a predetermined distance along the launcher tube 10.

It will now be assumed that rocket motor assembly 20 is properly loaded into launcher tube 10, as illustrated in Fig. 6A, and it is desired to actuate the ejection seat. By conventional means, the pilot fires the igniter 31, igniting the booster propellant 37, pressurizing the booster tube 30 and zone of the breech chamber between the nozzle assembly 40 and reflex piston 48, causing the reflex piston 48 to travel rearwardly into abutting relation with breechblock 13 and out of engaging relation with locking ring 46, thereby permitting the trailing edge portion 46a of ring 46 to spring inwardly and pass over the lower edge of motor tube 22 and releasing the motor assembly 20 for movement along the launcher tube. It is apparent that up to this point the booster tube combustion gases are constrained from contact with the sustainer propellant grain 23 by the slide valve 33 which closes the apertures 32, and blowout plugs 45 which close the sustainer nozzles 44. As is understood in the art, simultaneously with the above operations the cockpit canopy is cast off and the pilot is constrained to the seat. The booster gases produced by the booster propellant strip 39 are contained within the launcher tube 10 and work against the rocket motor assembly, which is in effect a piston, causing it to travel out of the launcher tube. Cable 50 of the lost motion linkage is in effect connected to the launcher breech 11, since the reflex piston remains in abutting relation with the breechblock zone 13 of the launcher breech 11 as long as the launcher tube 10 is pressurized. In traveling upward, the rocket motor 20 in effect runs up the cable 50, with the sleeve 38 sliding over the cable. As predetermined by the length of the cable 50, the apertures 32 are opened when the abutment 54 engages the sleeve 38, as shown in Fig. 6B, permitting hot gases produced within the booster tube 30 to flow into the free volume within the sustainer grain. Meanwhile the cable 50 disconnects from the motor tube assembly 20, the abutment 54 being adapted to detach or disengage from the cable. After a brief ignition delay, taking approximately the short period of time required for the motor assembly 20 to travel the remaining few inches out of the launcher tube, the hot booster gases ignite the sustainer grain 28, producing combustion gases that propel the rocket assembly 20 and attached seat as a free flight rocket, as shown in Fig. 6C. The gases produced by the sustainer propellant 28 simultaneously exhaust through the sustainer nozzles 44, apertures 32, and weakened zones 32a which have ruptured. The gases flowing through apertures 32 and weakened zones 32a flow through the booster tube 30 and out booster nozzle 42. Because of the orientation of the nozzles, the direction of thrust as a free flight rocket is along the direction of arrow T. When the seat is propelled to an altitude permitting safe escape, delay initiators release the pilot from the seat and the pilot's parachute is automatically opened by means heretofore known in the art.

Obviously many modifications and variations of the present invention are possible in the light of the above teachings. It is therefore to be understood that within the scope of the appended claims the invention may be practiced otherwise than as specifically described.

What is claimed is:

1. In apparatus for use in piston action rocket action aircraft ejection seat having a launcher tube with breech end attached to the aircraft and a rocket motor assembly attached to the seat and slideably engaged within the launcher tube; said rocket motor assembly including an elongated rocket motor tube, an internal burning cylindrical sustainer propellant grain disposed within the majority of the length of said motor tube and having a central perforation extending between its ends, one end of said motor tube having a first nozzle means for exhausting combustion gases produced by said propellant grain when ignited, said first nozzle means having blowout means which remain therein until said grain is ignited, the other end of said motor tube being closed, a booster tube disposed within said perforation with annular clearance to provide free volume within said propellant grain, said booster tube being closed at the end thereof adjacent the closed end of said motor tube, and having at the other end thereof second nozzle means for exhausting combustion gases, said second nozzle means being adjacent said first nozzle means, said first and second nozzle means being constructed and arranged to exhaust angularly to the longitudinal axis of the motor tube to produce a component of thrust passing through the seat, the improvements comprising; said booster tube having at least one aperture extending through its wall, a tubular slide valve within the booster tube closing said aperture and adapted to open said aperture upon being moved to an open position, igniter means within said booster tube, booster propellant means within said booster tube, a lost motion linkage connecting said valve and the breech end of said launcher tube adapted to move said slide valve to open position, said igniter means being operable to ignite said booster propellant means for producing combustion gases, said combustion gases produced by said booster propellant means being operable to cause said rocket motor assembly to travel out of the launcher tube, said slide valve being adapted to prevent combustion gases produced by said booster propellant means from passing through said aperture until said rocket motor assembly has moved to a predetermined position along said launching tube at which position said lost motion linkage is operable to open said aperture and permit hot combustion gases produced by said booster propellant means to pass through said aperture, said hot gases passing through said aperture being operable to effect the ignition of said sustainer propellant grain, the combustion gases produced by said sustainer propellant grain being operable to produce thrust to project the seat away from the aircraft after said rocket motor assembly leaves the launcher tube, a portion of said combustion gases produced by said sustainer propellant grain after ignited adapted to pass through the aperture in the booster tube whereby gas is simultaneously exhausted through said first and second nozzle means.

2. Apparatus in accordance with claim 1 wherein said booster tube has at least one weakened zone, adapted to rupture when the sustainer propellant grain ignites thereby providing supplementary communication area between the booster tube and said annular clearance.

3. Apparatus in accordance with claim 1 including a reflex piston adapted to move into abutting relation with said breech end of the launcher tube when the launcher tube is pressurized, and wherein said lost motion linkage comprises a cable extending through said second nozzle means, and having one end secured to said reflex piston, and detachable means on the other end of said cable adapted to open said slide valve after said rocket motor has moved a predetermined distance along the launcher tube.

4. Apparatus in accordance with claim 3 including a member disposed within said booster tube having an end engaging said slide valve, and an abutment thereon adapted to engage said detachable means.

References Cited in the file of this patent

UNITED STATES PATENTS

| | | |
|---|---|---|
| 2,434,652 | Hickman | Jan. 20, 1948 |
| 2,724,237 | Hickman | Nov. 22, 1955 |

OTHER REFERENCES

Aviation Week Magazine, November 12, 1956, vol. 65, No. 20, pages 71, 72, 74 and 77 relied upon.